(12) United States Patent
Jung

(10) Patent No.: US 7,747,948 B2
(45) Date of Patent: Jun. 29, 2010

(54) METHOD OF STORING DATA IN A PERSONAL INFORMATION TERMINAL

(75) Inventor: Jae Ho Jung, Chungrang-gu (KR)

(73) Assignee: LG Electronics Inc., Seoul (KR)

( * ) Notice: Subject to any disclaimer, the term of this patent is extended or adjusted under 35 U.S.C. 154(b) by 1016 days.

(21) Appl. No.: 10/036,378

(22) Filed: Jan. 7, 2002

(65) Prior Publication Data

US 2002/0091709 A1 Jul. 11, 2002

(30) Foreign Application Priority Data

Jan. 8, 2001 (KR) .......................... 2001-0001000

(51) Int. Cl.
*G06F 17/30* (2006.01)
*G06F 3/048* (2006.01)

(52) U.S. Cl. .................. 715/255; 715/249; 715/764; 715/864; 707/610; 707/635; 707/805; 707/809

(58) Field of Classification Search ............. 715/523, 715/764, 780, 781, 864, 224, 255, 248–249; 707/10, 100, 203, 200, 201, 204, 102, 104.1, 707/610, 635, 805, 809
See application file for complete search history.

(56) References Cited

U.S. PATENT DOCUMENTS

| 4,864,497 A | * | 9/1989 | Lowry et al. ............... 707/102 |
| 5,392,390 A | * | 2/1995 | Crozier ....................... 715/751 |
| 5,392,447 A | * | 2/1995 | Schlack et al. ............. 715/863 |
| 5,708,828 A | * | 1/1998 | Coleman ..................... 715/205 |
| 5,710,917 A | * | 1/1998 | Musa et al. .................. 707/201 |
| 5,761,656 A | * | 6/1998 | Ben-Shachar .................. 707/4 |
| 5,870,765 A | * | 2/1999 | Bauer et al. ................. 707/203 |
| 5,940,845 A | * | 8/1999 | Prager et al. ................ 715/536 |
| 5,966,717 A | * | 10/1999 | Sass ........................... 707/204 |
| 5,999,937 A | * | 12/1999 | Ellard ........................ 707/101 |
| 6,009,428 A | * | 12/1999 | Kleewein et al. ............. 707/10 |
| 6,125,369 A | * | 9/2000 | Wu et al. .................... 707/201 |

(Continued)

OTHER PUBLICATIONS

Google Search Result, "define: delimiter", pp. 1-2, http://www.google.com/search?hl=en&q=define%3A+delimiter.*
Foldoc, "delimiter", pp. 1, http://foldoc.org/foldoc.cgi?query=delimiter.*
Google Search Result, "define: delimiter", [retrieved on May 17, 2006]. Retrieved from the Internet <URL: http://www.google.com/search?hl=en&q=define%3A+delimiter>, pp. 1-2.*
Foldoc (Free Online Dictionary of Computing), "delimiter", Mar. 16, 2001 [retrieved on May 17, 2006]. Retrieved from the Internet <URL: http://foldoc.org/foldoc.cgi?query=delimiter>, p. 1.*

*Primary Examiner*—Adam L Basehoar
(74) *Attorney, Agent, or Firm*—KED & Associates, LLP

(57) ABSTRACT

A method of storing all or part of data entered to an application program embedded in a personal data assistant to another application program is disclosed. A data storing method includes composing data in one of a plurality of application programs embedded in the personal data assistant, wherein the application programs have mutually different data formats, converting a format of the composed data to a suitable format for another application program manually or automatically, and storing the format-converted data in the other application program.

19 Claims, 6 Drawing Sheets

U.S. PATENT DOCUMENTS

| | | | |
|---|---|---|---|
| 6,272,545 B1 * | 8/2001 | Flanagin et al. | 709/228 |
| 6,295,541 B1 * | 9/2001 | Bodnar et al. | 707/203 |
| 6,377,243 B1 * | 4/2002 | Tomoda et al. | 345/163 |
| 6,378,001 B1 * | 4/2002 | Aditham et al. | 719/313 |
| 6,442,570 B1 * | 8/2002 | Wu | 707/201 |
| 6,701,376 B1 * | 3/2004 | Haverstock et al. | 709/246 |
| 6,810,405 B1 * | 10/2004 | LaRue et al. | 707/201 |
| 7,152,205 B2 * | 12/2006 | Day et al. | 715/239 |
| 7,577,900 B2 * | 8/2009 | Passero et al. | 715/200 |
| 7,644,357 B2 * | 1/2010 | Aoyama | 715/249 |
| 2002/0174098 A1 * | 11/2002 | Wu et al. | 707/1 |
| 2004/0139076 A1 * | 7/2004 | Pendleton | 707/10 |
| 2006/0129746 A1 * | 6/2006 | Porter | 711/100 |
| 2008/0034315 A1 * | 2/2008 | Langoulant et al. | 715/780 |

* cited by examiner

RELATED ART

US 7,747,948 B2

METHOD OF STORING DATA IN A PERSONAL INFORMATION TERMINAL

BACKGROUND OF THE INVENTION

1. Field of the Invention

The present invention relates to a Personal Data Assistant (PDA), and more particularly to a method of storing data in a plurality of application programs embedded in a PDA.

2. Background of the Related Art

A Personal Data Assistant (PDA) or Personal Information Manager (PIM) is a small portable information terminal having many functions of a computer and an electronic organizer, and may also have communication functions. A PDA typically uses a touch screen as an input/output device. The touch screen displays icons associated with various embedded application programs, as shown in FIG. 1.

A PDA may have various basic application programs embedded in it. Examples of the basic embedded application programs include a "Calendar" for scheduling appointments and meetings, "Contacts" for tracking friends and colleagues, "Tasks" for keeping a to-do list, and "Notes" for recording thoughts and ideas.

To use the PDA, a PDA user chooses an application program suitable to data that the user wishes to enter and store, and executes the application by tapping a corresponding icon displayed on the touch screen. When the application is opened, the user enters desired data in the PDA through the executed application program. The entered data is formatted in a way that is suitable for the particular application program, and is stored in a database (DB) corresponding to the application.

For example, if a PDA user wants to record his or her ideas or thoughts, or wants to search for a previously stored note, the user taps a "Notes" icon displayed on the touch screen to execute the basic Notes program. After execution of the Notes program, the user would enter his or her ideas or thoughts, or review a previously stored note.

In addition, if the user wants to enter a private schedule event consisting of date, time, location, and agenda, or to review a previously stored event, the user would tap a "Calendar" icon to execute the basic Calendar program. The user could then enter a private schedule event or confirm a previously stored schedule event.

Further examples of the operations of the aforementioned basic application programs are described in chapter 4, "Microsoft Pocket Outlook", of the manual entitled "iPAQ H3000 Pocket PC Reference Guide" for a PDA manufactured by Compaq.

Each of the aforementioned basic application programs has its own DB for individually storing entered user data. Each DB has fields different from the other DBs. For example, the "Calendar" program accepts fields such as time, date, and so forth. On the other hand, the "Contact" program accepts fields such as name, address, telephone number, and so forth. Therefore, each application program has an individual DB having different fields.

Because of such field differences among individual DBs, if an entry needs to be entered in the "Contact" program where the desired data is being entered through the "Notes" program, the "Contact" program must be tapped and executed, and the data needs to be re-entered and stored. Additionally, if a private schedule entry is to be entered as well, the "Calendar" program must be executed and the desired schedule entry is entered into a corresponding DB through the "Calendar" program.

Thus, if a user writes data into the "Notes" program that is suitable for the "Contacts" program (for example telephone number and address), and also writes data that is suitable for the "Calendar" program, (for example, appointment time, schedule event, location, and agenda) all of the data must be re-entered after executing an appropriate application program. This repetition of data entry and program execution creates a duplication of effort and can be tedious and inconvenient.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a method of storing data in a PDA terminal, which can convert a format of data entered for an arbitrary executed application program to another format suitable for another application program.

It is another object of the present invention to provide a method of storing data in a PDA, which can store format-converted data in the another application program without data re-entering or additional program execution.

In order to achieve al least the above objects in whole or in parts, there is provided a method of storing data, including composing data in one of a plurality of application programs embedded in the personal data assistant, the application programs having mutually different data formats; converting a format of the composed data to a format suitable for a second application program with or without assistance of a user; and storing the format-converted data in the second application program database.

In order to further achieve at least the above objects in whole or in parts, there is provided a method of storing data in a personal information terminal, including composing data having a prescribed identifier code in a first one of a plurality of application programs, the prescribed identifier code being indicative of a second one of the plurality of application program into which the composed data is to be stored, selecting the second application program among the plurality of application programs based on the prescribed identifier code using a table to match prescribed identifier codes to corresponding application programs, converting a format of the composed data from a first format to a second format, the second format corresponding to a format required by the second application program, and storing the data in a database associated with the second application program.

In order to further achieve at least the above objects in whole or in parts, there is provided a method of storing data in a personal information terminal, including composing data of a first format in a first one of a plurality of application programs embedded in the personal information terminal, each of the plurality of application programs having mutually different data formats, selecting a second application program in which to store the composed data, converting a format of the composed data to a second format used by the second application program, and storing the format-converted data in the second application program.

In order to further achieve at least the above objects in whole or in parts, there is provided a personal data assistant (PDA), including an input/output interface, configured to receive commands from a user and display information, a central processing unit (CPU), configured to receive and process commands entered into the PDA, and a memory, configured to accommodate a plurality of data bases associated with a plurality of application programs, wherein a first application program stored on the PIM is configured to receive and store data in a first database using a first data format, a second application program stored on the PDA is configured to receive and store data in a second database using a second data format, and wherein a conversion program is executed by the CPU to receive the data in the first data format, reformat the received data to the second data format, and store the reformatted data in the second database.

In order to further achieve at least the above objects in whole or in parts, there is provided a computer readable medium having stored thereon a sequence of instructions which, when executed by a processor, cause the processor to perform a sequence of steps, including reading data of a first format from a first application program, converting the first format to a second format, the second format being suitable for a second application program, storing the data in the second format in a database associated with the second application program.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
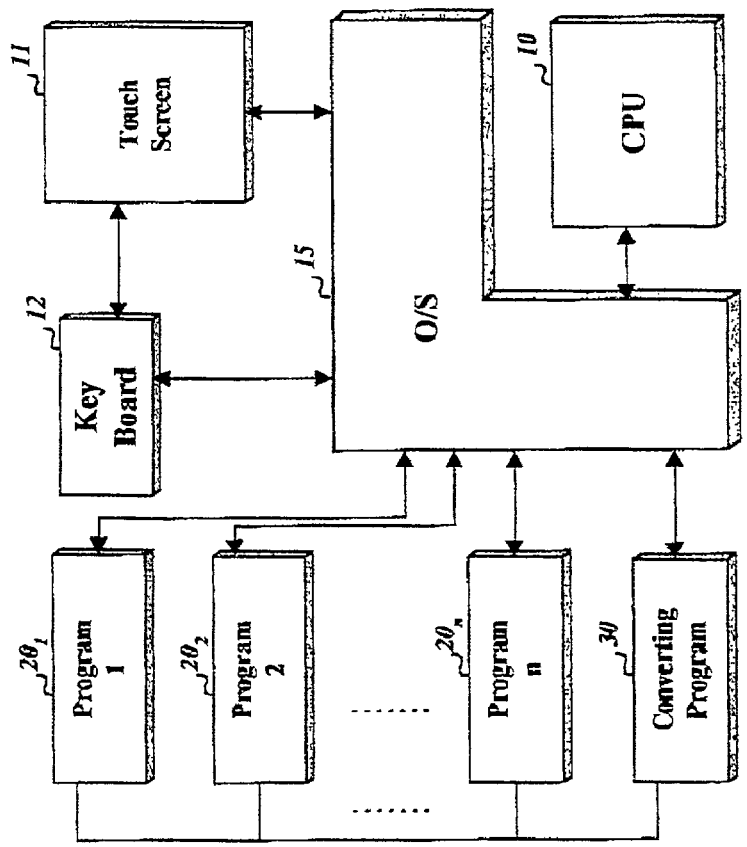
FIG. 2 is a block diagram of a PDA according to a preferred embodiment of the present invention.
Figure 1:
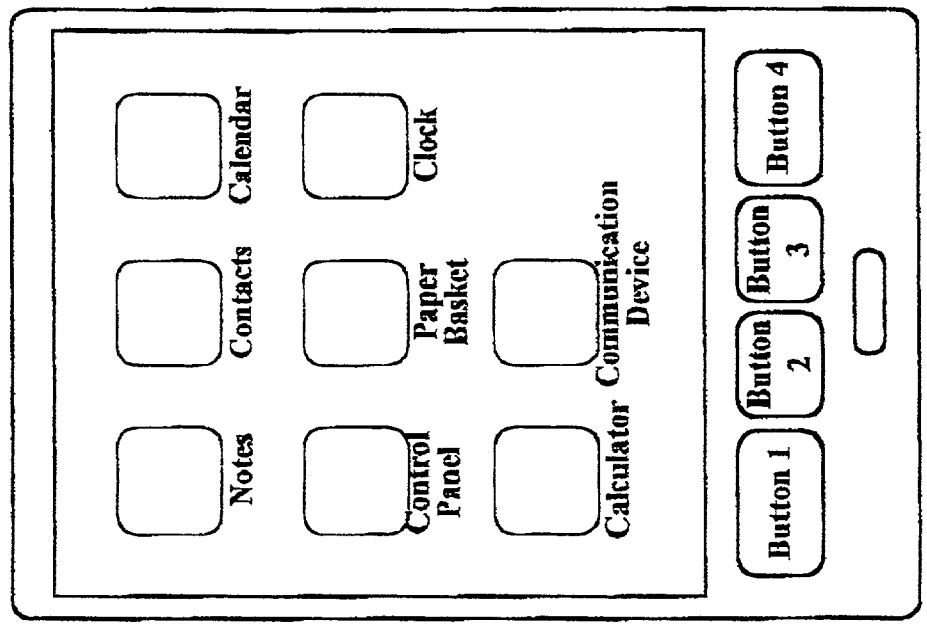
FIG. 1 illustrates a related art personal data assistant (PDA)

FIG. 2 is a block diagram of a PDA using a data storing method according to the preferred embodiment of the present invention. The PDA preferably includes a touch screen 11 to display a plurality of icons associated with various embedded application programs and to detect a user's tapping, and a key pad 12 to receive key inputs. The PDA also preferably includes various application programs (APPs) $20_1$-$20_n$, such as "Notes" and "Calendar", each having its own DB for storing received data after appropriate formatting.

Next, a format converting program 30 is provided to convert a format of data received from an arbitrary APP $20_1$-$20_n$ to a format suitable for another APP, and an operating system (O/S) 15 is provided to enable communication channels among the APPs $20x$ and to drive hardware resources. Finally, the PDA includes a CPU 10 to execute an APP selected by a user and manage all of the elements to conduct an operation requested by a user, through the assistance of the O/S 15.

Figure 3:
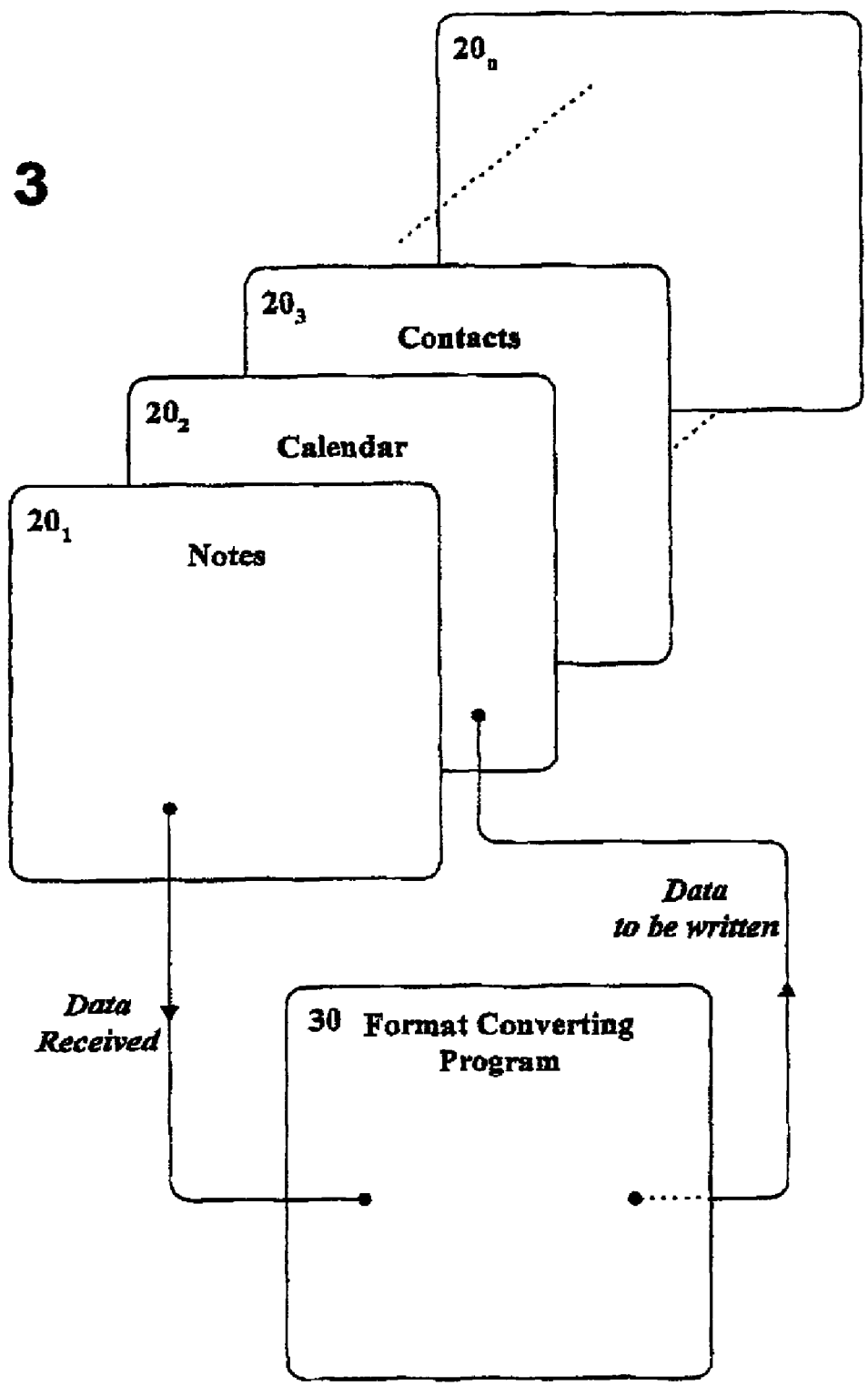
FIG. 3 is a schematic diagram illustrating various application programs to be linked with a format converting program according to the preferred embodiment of the present invention.

Referring to FIG. 3, the format converting program 30 preferably conducts the conversion of data between the various formats, such as "Notes" $20_1$, "Calendar" $20_2$, and "Contacts" $20_3$, etc. For example, while a user is entering desired data through the "Notes" program $20_1$, the format converting program 30 preferably converts the entered data to another application format. Thus, unformatted private schedule data can be converted to a format that is acceptable to the "Calendar" program $20_2$. The data storing method is described below in further detail.

Figure 4:
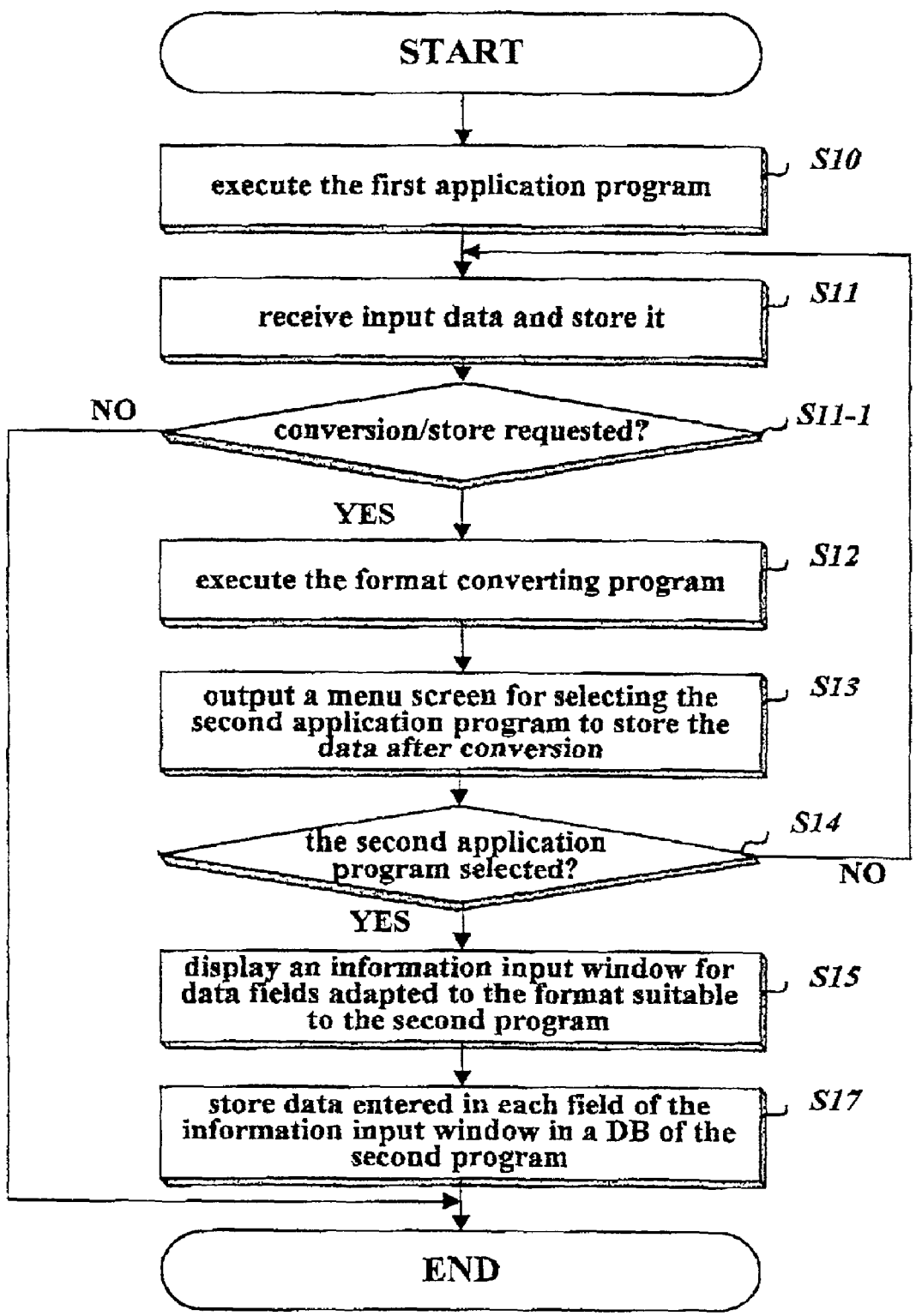
FIG. 4 is a flow chart illustrating a method of storing data according to the preferred embodiment of the present invention.

FIG. 4 is a flow chart showing a data storing method according to the preferred embodiment. Referring to FIG. 4, it is assumed that several icons related with various APPs $20_1$~$20_n$ have been displayed on the touch screen 11. If a user taps an arbitrary program, e.g., the "Notes" program $20_1$ on the touch screen 11, the CPU 11 recognizes the selection of the "Notes" program $20_1$ through the O/S 15 and executes the "Notes" program $20_1$ (S10).

Accordingly, the user may then freely enter desired data in an input screen of the executed "Notes" program $20_1$. This can be done through the touch screen 11 or any other data input method. The "Notes" program $20_1$ adapts the entered data to its DB structure and stores the adapted data in its DB (S11).

If the user wants the contents of the data entered in the "Notes" program $20_1$ also to be stored in another APP, for example, the "Calendar" program $20_2$, the user preferably requests a format conversion by selecting a "conversion/store" menu item which may be prepared in all APPs (S11-1). The CPU 10 is preferably notified of the format conversion request through the O/S 15 when the "Notes" program $20_1$ detects the selection of its "conversion/store" menu item. The format converting program 30 is then executed (S12). Alternatively, the user may set up the PDA to automatically convert entries without having to select the "conversion/store" menu item.

Figure 5:
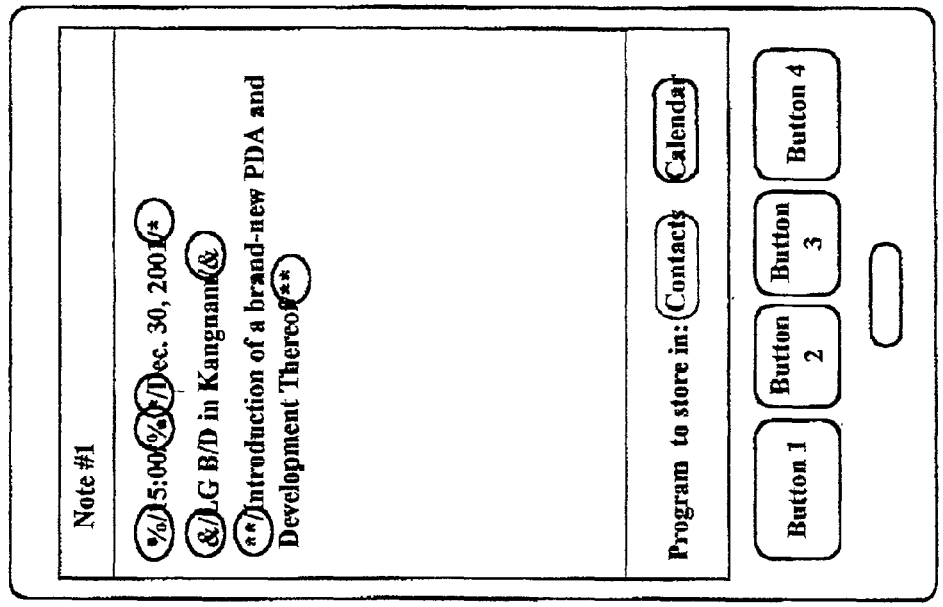
FIGS. 5 to 7 are exemplary PDA screens displayed by a data storing method according to the preferred embodiment of the present invention.

The format converting program 30 preferably generates a menu screen, as shown in FIG. 5, to receive a user's selection of a target APP in which the stored data from the "Notes" program is to be stored after appropriate format conversion (S13). The menu screen may contain icons 51a, 51b associated with target APP candidates, e.g., "Contacts" and "Calendar", which will receive the same contents of the data entered into the "Notes" program.

Alternatively, instead of the candidate icons, the target APP candidates may be contained in a pop-up window which could be opened at the right-click of a mouse or selection of a menu. Many other methods are possible for selecting the target APP.

When the user chooses a target APP, for example, the "Calendar" program, through the appropriate selection method (S14), the format converting program 30 preferably presents an information input window 52 in the touch screen 11. The information input window 52 preferably includes sub-windows corresponding to data fields necessary for storing data in a format suitable for the selected program (S15). The information input window to be activated for a given target APP is preferably pre-assigned.

By way of example, the information input window for the "Calendar" program may contain fields of "date," "time," "location," and "agenda." Data entered in each field of the information input window is stored in a DB of the "Calendar" program by the format converting program 30 (S17).

The format converting program 30 preferably stores the data entered in the corresponding fields in the "Calendar" DB. This can be done either with or without an intervention of the "Calendar" program. When the intervention of the "Calendar" program is provided, the format converting program 30 activates the "Calendar" program first, and then, delivers the data entered in every fields through the communication channel of the O/S 15 to the activated "Calendar" program. The "Calendar" program will then store the received data in its DB.

In the meantime, the CPU 10 continues monitoring whether termination of the running "Notes" program is requested from the user. If requested, it conducts a termination process of the "Notes" program.

The above example described a process of converting information from the "Notes" program to the "Calendar" program. It should be understood that the process can be used to convert a data format from any first program to any second program.

Additionally, in the above embodiment, data must be entered in prescribed fields to be stored in another APP. However, in a second embodiment of the present invention, data from a first APP can be automatically stored in a second APP without entering data in data fields. In this embodiment, for example, a user enters text or a memorandum in the "Notes" program in such a manner that the written order of its constituting words or phrases is matched with a field order of the target APP. Additionally, the user can set a block, if necessary, in the desired text or memorandum to be segmented into each data field of the target APP.

Figure 6:
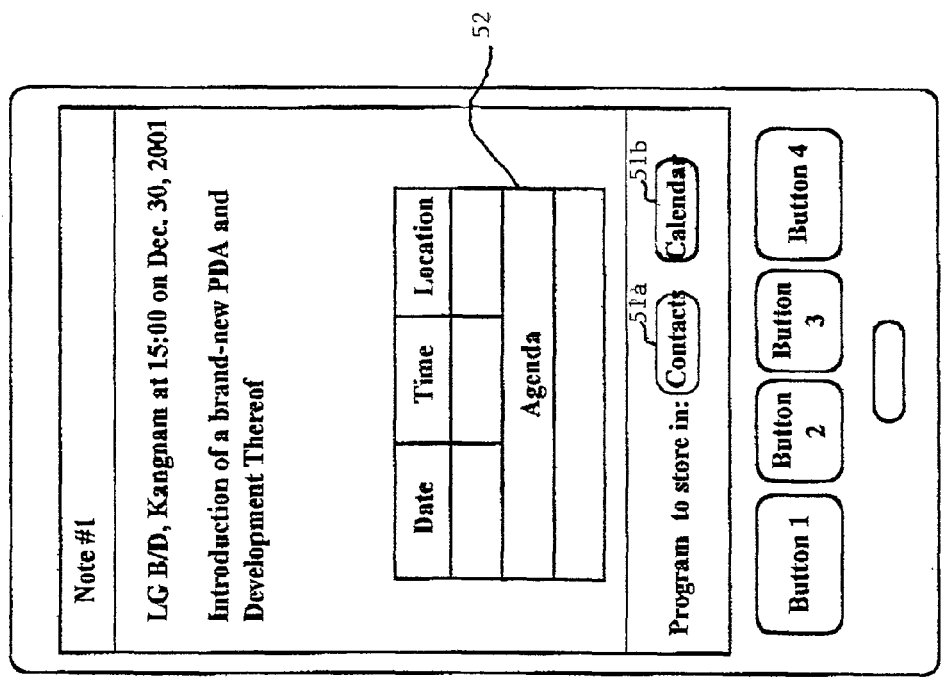

For exact automatic segmentation, a user preferably enters delimiters in a text or a memorandum. For example, the user may enter delimiters before or behind each word or phrase corresponding to a respective data field, such as "date," "time," "location," "agenda", and so forth, as shown in FIG. 6. It should be understood that any delimiter, including a blank space or carriage return, could be used.

Thus, according to the second embodiment, a user executes a first application by selecting the associated icon. For example, the "Notes" program is executed by tapping the "Notes" icon. Text or a memorandum can then be entered in accordance with a prescribed input rule. In the prescribed input rule, each tag is predefined. For example, the "$C" tag could be used to indicate the "Calendar" program, the "$T" could be indicative of the "Contacts", and so forth. In addition, a specific symbol such as space, "/&", and "^" can be used as a delimiter.

Thus, when a user enters a schedule entry in the "Notes" program according to the input rule, the user would write "$C" first and then date, time, and agenda in order, with a delimiter between each data field.

Figure 7:
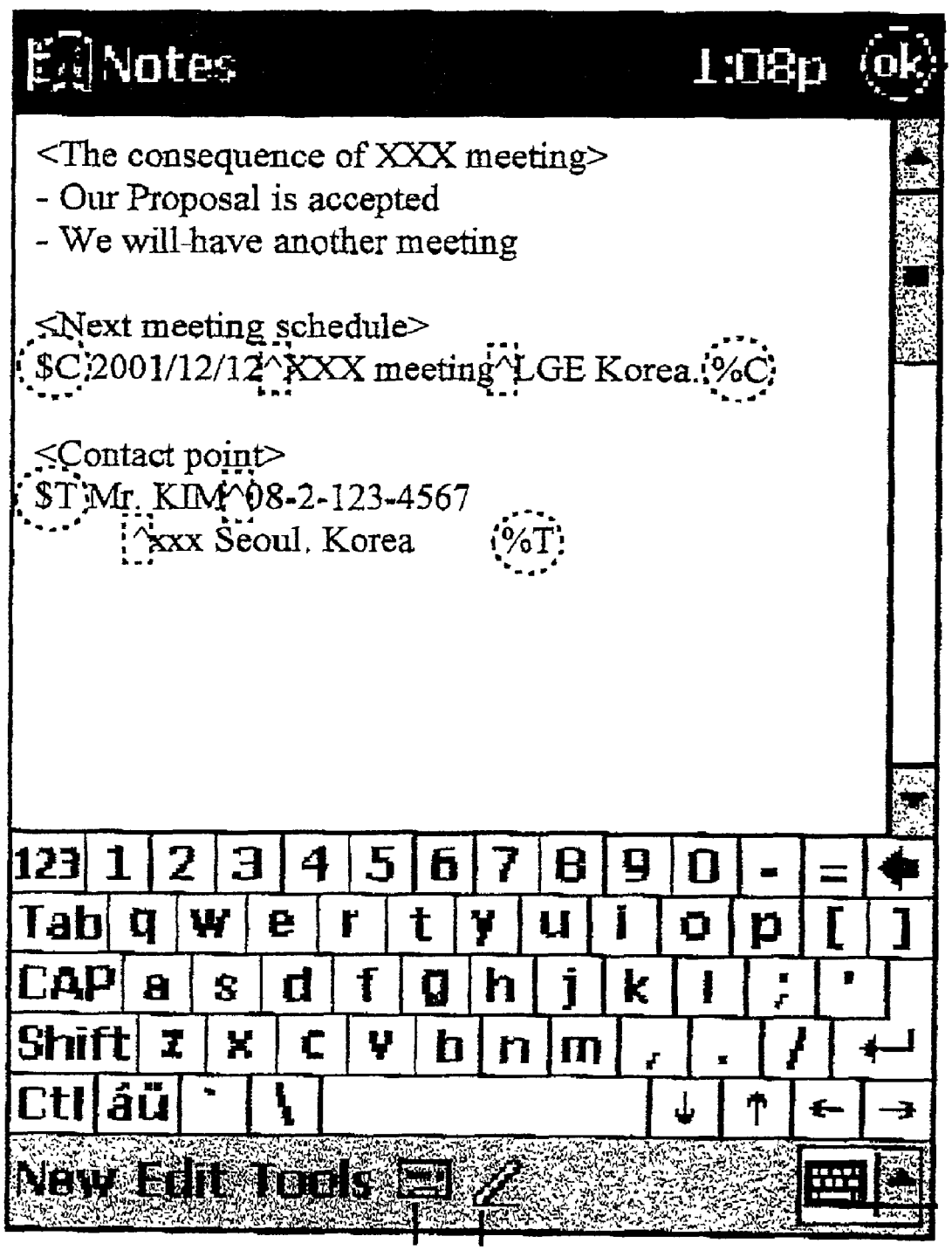

FIG. 7 shows an exemplary memorandum regarding a meeting schedule entry adapted to the input rule. In the memorandum of FIG. 7, the "$C" tag is used to inform the format converting program 30 that the memorandum is associated with a schedule event, and the delimiter "^" is used. Additionally, "%C" is used to indicate the end of the schedule information, and "$T"/"%T" indicates contact information.

Figure 8:
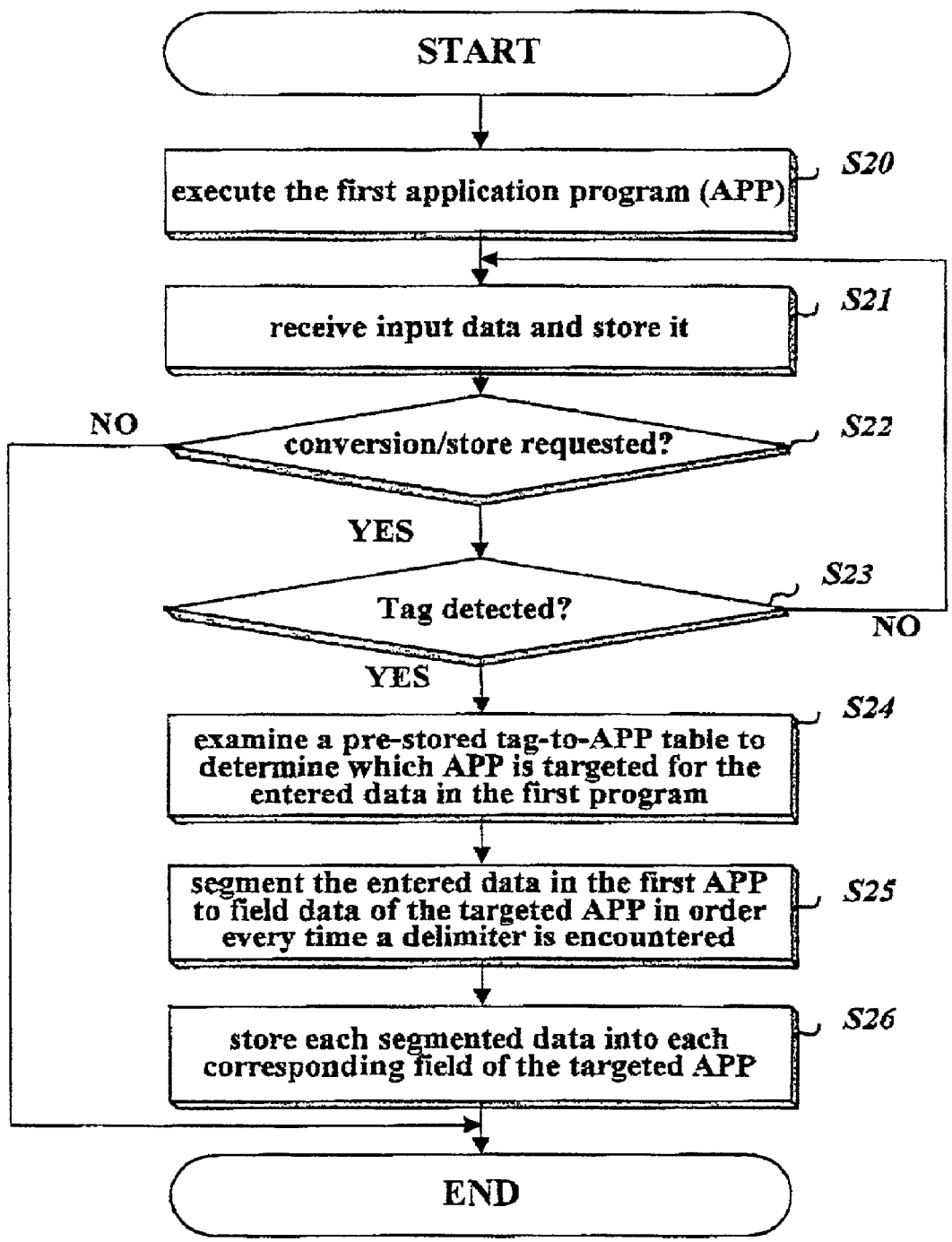
FIG. 8 is a flow chart of another preferable embodiment of a data storing method according to the preferred embodiment of the present invention.

FIG. 8 is a flow chart depicting an automatic format converting method of the format converting program 30 according to the second embodiment. First, a user initiates a first application program (S20). For purpose of example, the "Notes" application will be described. Next, data is entered into the application (S21). The data should include the tags and delimiters as shown in FIG. 7. Next it is determined whether a conversion/store command has been received (S22). If the user commands data conversion/store after entering text or a memorandum with the proper tags and delimiters, the format converting program 30 scans the entered text or memorandum copied from the "Notes" program through the communication channel of the O/S 15 to detect which tag has been included.

If a tag is detected (S23), the format converting program 30 examines a prescribed tag-to-APP table to determine which APP is targeted for the entered text or memorandum (S24). If the detected tag indicates that the "Calendar" application is the target, the format converting program 30 recognizes that the entered text or memorandum is also to be stored in the "Calendar" program. The format converting program 30 thus segments the text or memorandum, excluding the tag, into each data field every time a delimiter is encountered (S25). The segmented data is then stored in the corresponding each field data entry of the DB of the targeted APP (S26).

The tag, the delimiter, and field entry order may be changed freely by a user for the purpose of user-friendly data entering method.

Each APP can store the entered data in its own DB allocated in program itself or in a file assigned to its DB.

The method of storing data according to the disclosed embodiments has many advantages. For example, it provides for a method for simply converting input data, entered in a format suitable for one of a plurality of application programs embedded in a personal data assistant (PDA), to have different format suitable for another application program chosen by a user, and storing the format-converted data in said another application program.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of storing data in a personal data assistant (PDA), comprising
    composing data in a first application program of a plurality of application programs embedded in the PDA, the data being of a first format, wherein composing the data includes entering data in an input screen of the PDA associated with the first application program;
    selecting a conversion of the entered data from the first format to a second format suitable for a second application program, by selecting one of a plurality of icons that are displayed on the input screen of the PDA, wherein each of the icons represents a corresponding one of the plurality of application programs;
    in response to selecting one of the icons, providing an information input window in the input screen, for a user to enter data for the second application program, the information input window being displayed on the input screen together with the composed data, and the user entering data into a plurality of data fields of the information input window;
    converting the entered data to the second format of the plurality of application programs using a conversion program provided in the PDA; and storing the converted data in a database associated with the second application program, the database provided in the PDA, wherein each of the plurality of application programs is selectively operated in the PDA, and wherein the first application program, the conversion program and the second application program are initiated and executed on the PDA, the conversion program to convert data from any one of the plurality of application programs into data in a format of any other of the plurality of application programs.

2. The method of claim 1, wherein a data format of each application program is different from a data format of the other application programs.

3. The method of in claim 1, wherein each application program has an associated database in the PDA to store data in the corresponding application program.

4. The method of claim 1, wherein the first application program is a document editing program and the second application program is one of a calendar application to store schedule event data or a contact manager application to store personal contact information data.

5. The method of claim 1, wherein composing data in the first application program comprises selecting the second application program in which to store the composed data.

6. The method of claim 1, wherein converting the entered data comprises assigning data entered through the information input window to a corresponding data field of the second application program.

7. A method of storing data in a personal data assistant (PDA), comprising:
  manually entering, in an input screen, first data including a first prescribed identifier and second data including a second prescribed identifier while executing a first one of a plurality of application programs in the PDA, the first prescribed identifier to indicate a second one of the plurality of application programs into which the first entered data is to be stored, and the second prescribed identifier to indicate a third one of the plurality of application programs into which the second data is to be stored;
  determining whether the first prescribed identifier is present;
  determining whether the second prescribed identifier is present;
  determining the second application program from among the plurality of application programs based on the first prescribed identifier using a table that matches prescribed identifiers to corresponding application programs;
  converting a format of the first entered data from a first format to a second format using a conversion program provided in the PDA, the second format corresponding to a format required by the second application program;
  determining the third application program from among the plurality of application programs based on the second prescribed identifier using the table that matches prescribed identifiers to corresponding application programs;
  converting a format of the second entered data from the first format to a third format using the conversion program provided in the PDA, the third format corresponding to a format required by the third application program; and
  storing the converted first data in a first database associated with the second application program and storing the converted second data in a second database associated with the third application program, the first database and the second database provided in the PDA, wherein each of the plurality of application programs is selectively initiated and executed in the PDA,
  wherein the conversion program to perform the detecting, the selecting, the converting and the storing.

8. The method of claim 7, wherein the first prescribed identifier specifies a data section including a part of the first entered data, and wherein converting the format of the entered first data converts the first data in the specified data section to the second format.

9. The method of claim 8, wherein each of the plurality of application programs has a unique database associated with it, each database having unique data fields, and wherein the specified data section contains at least one delimiter to segment the data into each field data of the database to which it will be stored.

10. The method of claim 9, wherein the delimiter is one of a blank space, "/", and "^".

11. The method of claim 7, wherein the first application program is a document editing program, and the second application program is one of a commercial program named "Phone Book", "Contacts", "Scheduler", or "Tasks".

12. The method of claim 7, wherein the first identifier includes a first sub-identifier provided prior to the first entered data and a second sub-identifier provided after the first entered data.

13. A method of storing data in a personal data assistant (PDA), comprising:
  entering data by a user while executing a first one of a plurality of application programs embedded in the PDA, each of the plurality of application programs having mutually different data formats, wherein the first application program is a document editing program;
  displaying a plurality of icons while executing the first one of the application programs, wherein each of the icons corresponds to a different one of the plurality of application programs;
  selecting one of the displayed plurality of icons in order to select a second application program in which to store the entered data;
  converting the entered data by the user in the document editing program to a second format used by the second application program using a conversion program provided in the PDA, the second application program comprising one of a contact manager, an appointment scheduler, a telephone number organizer or a task list; and
  storing the converted data in the second application program, wherein the first application program, the conversion program and the second application program are initiated and executed on the PDA, the conversion program to convert data from any one of the plurality of application programs into data in a format of any other one of the plurality of application programs,
  wherein converting the entered data comprises:
    providing an information input window having a plurality of data fields for entering format-matched data for the second application program, the information input window being displayed on an input screen together with the data composed in the first application program in response to a selection of one of the displayed icons, and
    assigning data entered through the data fields of the information input window to corresponding data fields of the second application program.

14. The method of claim 13, wherein each of the plurality of application programs has its own database in which to store data composed in the corresponding application program.

15. The method of claim 13, wherein the information input window includes a plurality sub-windows in which to enter field data to be stored in corresponding fields of a database of the second application program, the database provided in the PDA.

16. The method of claim 13, wherein the second application program is one of a commercial program named "Phone Book", "Contacts", "Scheduler", or "Tasks".

17. A personal data assistant (PDA), comprising:
an input/output interface of the PDA, configured to receive commands from a user and to display information, the input/output interface to enter data associated with a first application program based on inputs of a user, the entered data including an identification marker to identify a second application program;
a central processing unit (CPU) of the PDA, configured to receive and process commands entered into the PDA; and
a memory of the PDA, configured to accommodate a plurality of databases associated with a plurality of application programs, the plurality of databases provided in the PDA, wherein a first application program stored on the PDA is configured to receive and store data in a first database using a first data format, a second application program stored on the PDA is configured to receive and store data in a second database using a second data format, the second data format selected based on the identification marker input by the user that identifies the second application program, and wherein a conversion program of the PDA is executed by the CPU to receive the data in the first data format, reformat the received data to the second data format, and store the reformatted data in the second database,
wherein the first application program, the conversion program and the second application program are initiated and executed on the PDA, wherein contents of the first data format entered in the first application program in the PDA are stored as re-formatted data of the second data format in the second database in the PDA to match the second database to the first database while the first application program is executed, the conversion program to convert data from any one of the plurality of application programs into data in a format of any other one of the plurality of application programs, and
wherein the conversion program performs manual conversion of data by generating an information input window having a plurality of data fields within the first application program for inputting data in a plurality of prescribed fields of the second application program, wherein each of the data fields of the information input window corresponds to a different one of the prescribed fields of the second application program.

18. The PDA of claim 17, wherein the first application program is a document editing program, and wherein the second application program is one of a contact manager program, an address book program, a calendar program, a task tracking program, or an appointment tracking program.

19. The PDA of claim 17, wherein data inputted into sub-windows of the information input window is stored into corresponding fields of the second database.

* * * * *